(12) United States Patent
Mottier

(10) Patent No.: US 8,406,158 B2
(45) Date of Patent: *Mar. 26, 2013

(54) METHOD FOR TRANSMITTING TDD FRAMES WITH INCREASED DATA PAYLOAD

(75) Inventor: David Mottier, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 13/040,658

(22) Filed: Mar. 4, 2011

(65) Prior Publication Data

US 2011/0149814 A1 Jun. 23, 2011

Related U.S. Application Data

(63) Continuation of application No. 11/140,883, filed on Jun. 1, 2005, now Pat. No. 7,929,467.

(30) Foreign Application Priority Data

Jun. 17, 2004 (EP) .................................. 04076732

(51) Int. Cl.
*H04J 3/00* (2006.01)
*H04B 1/44* (2006.01)
*H04J 3/06* (2006.01)

(52) U.S. Cl. ........ 370/280; 370/282; 370/498; 370/508; 370/528

(58) Field of Classification Search .................. 370/280, 370/282, 498, 508, 528
See application file for complete search history.

(56) References Cited

U.S. PATENT DOCUMENTS

| | | | |
|---|---|---|---|
| 5,150,247 A * | 9/1992 | Sharpe et al. | 398/98 |
| 6,031,827 A * | 2/2000 | Rikkinen et al. | 370/330 |
| 6,201,819 B1 | 3/2001 | Luders | |
| 6,493,335 B1 | 12/2002 | Darcie et al. | |
| 6,724,815 B1 | 4/2004 | Jepsen et al. | |
| 6,731,615 B1 | 5/2004 | Bousquet et al. | |
| 7,012,949 B2 | 3/2006 | Uesugi | |
| 7,154,879 B1 * | 12/2006 | Pfeffer et al. | 370/352 |
| 7,298,757 B1 | 11/2007 | Lin et al. | |
| 7,593,431 B1 | 9/2009 | Lo et al. | |
| 2002/0163695 A1 * | 11/2002 | Unitt et al. | 359/137 |
| 2003/0117980 A1 | 6/2003 | Kim et al. | |
| 2003/0169721 A1 * | 9/2003 | Tillotson | 370/347 |
| 2004/0047319 A1 * | 3/2004 | Elg | 370/338 |
| 2004/0105405 A1 | 6/2004 | Botzel et al. | |
| 2005/0078771 A1 | 4/2005 | Oh et al. | |
| 2005/0271088 A1 | 12/2005 | Shoemake et al. | |
| 2007/0217545 A1 | 9/2007 | Park et al. | |

FOREIGN PATENT DOCUMENTS

| | | |
|---|---|---|
| EP | 0 926 845 A2 | 6/1999 |
| EP | 1 511 190 A1 | 3/2005 |
| WO | WO 96/19086 | 6/1996 |

* cited by examiner

*Primary Examiner* — Farah Faroul
(74) *Attorney, Agent, or Firm* — Oblon, Spivak, McClelland, Maier & Neustadt, L.L.P.

(57) ABSTRACT

Method for transmitting through a bidirectional communication channel at least one conventional frame (CVFR) split into time slots SLI (for j=1 to L) separated from each other by guard intervals G, each time slot SLI being allocated either to a first or to a second direction of communication uplink (UL) or downlink (DL) offered by the bidirectional communication channel. The method according to the invention includes: detecting at least two successive time slots SLj, SLm+1, SLj+2 allocated to a same direction of communication DL, and inserting data in the guard interval separating such successive time slots SLj, SLj+1, SLj+2.

2 Claims, 2 Drawing Sheets

METHOD FOR TRANSMITTING TDD FRAMES WITH INCREASED DATA PAYLOAD

CROSS REFERENCES TO RELATED APPLICATIONS

This application is a continuation of and claims the benefit of priority under 35 U.S.C. §120 from U.S. Ser. No. 11/140,883, filed Jun. 1, 2005, the entire contents of which is incorporated herein by reference. The U.S. Ser. No. 11/140,883 claims the benefit of priority under 35 U.S.C. §119 from European Patent Application 04076732.9, filed on Jun. 17, 2004.

BACKGROUND OF THE INVENTION

1. Field of the Invention

The present invention relates to a method for transmitting information between at least two transceivers linked together by a bidirectional communication channel, said information being enclosed within at least one frame split into time slots separated from each other by guard intervals having each a predetermined duration, each time slot being allocated either to a first or to a second direction of communication offered by the bidirectional communication channel.

2. Description of the Related Art

The advantages of bidirectional communication channels for transmitting time-splitted frames are currently being assessed for the purpose of defining future generations of wireless telecommunication systems, particularly systems of the TDD type (standing for Time Division Duplex). In such systems, the bidirectional communication channel may for example enable a mobile terminal to send data to a base station in a so-called uplink direction, said base station conversely sending data to said mobile terminal in an opposite, so-called downlink, direction.

According to the known state of the art, the time slots are generally chosen of rather short duration, for example 0.666 milliseconds in a UMTS system compared to a standard frame duration of 10 milliseconds. One of the reasons for such a choice is the aim of obtaining almost invariant channel properties during the time duration of such a slot, i.e. during the time needed for transmitting the data included in said slot. Current theory provides that each slot should systematically include, in addition to its data payload, pilot symbols which are to be analysed by the receiver of said slot in order for said receiver to estimate the current channel properties on the basis of alterations observed with respect to expected pilot symbols. This receiver will thus be able to apply a pre-equalization, i.e. an equalization performed before transmission, to a data signal to be sent back immediately in the reverse direction through the same communication channel. In theory, if the time slots are short enough, the channel will not have varied and the pre-equalization will then almost perfectly compensate for the alterations the channel will cause to this data signal, which should ensure that said data arrive in their original, uncorrupted state and may thus be immediately processed without having to perform a local post-equalization, i.e. a local equalization performed after transmission.

Suppressing the need for local post-equalization is of particular interest when said equalization is to be performed by a mobile terminal whose computing resources are limited by the capacities of its internal processors, as well as by its finite power supply, usually constituted by a battery.

Additionally, pre-equalization is also of interest when performed by a mobile terminal, since it helps fighting adverse channel effects without requiring to raise the transmit power said terminal is to apply to the signal to be transmitted to the base station.

In the known art, a guard interval is usually provided between two successive slots in order to prevent them from interfering with each other. During such a guard interval, no information of any sort is hence to be transmitted. In a cellular telecommunication system, the duration of such a guard interval is determined on the basis of the size of the cell, which indicates the longest possible transmission delay between a mobile terminal and its relevant base station, which determines a highest round trip delay. According to current specifications of future telecommunication systems, cell radiuses may be considered smaller than one kilometer, so that the duration of a guard interval may be chosen equal to 6.7 microseconds.

SUMMARY OF THE INVENTION

It thus appears that the number of slots included in a frame of finite duration adversely impacts on the data payload of said frame, since the number of guard intervals, i.e. the time intervals included in the frame within which no information is exchanged through the channel, increases with the number of slots.

The invention aims at solving the aforementioned problem, by providing a method for transmitting information through a bidirectional communication channel, by virtue of which the data payload of a frame may be increased without requiring an increase of the total duration of the frame itself.

Indeed, a method according to the opening paragraph is characterized according to the invention in that it includes the following steps:

a detection step for detecting at least two successive time slots allocated to a same direction of communication, and a data insertion step for inserting data in the guard interval separating such successive time slots allocated to a same direction of communication.

The inventor has observed that a guard interval arranged between two successive time slots allocated to a same direction of communication is basically useless, since any given signal will not interfere with itself.

Such a guard interval, once detected in the course of the detection step, may thus be replaced by data thanks to the data insertion step, which will have the effect of increasing the overall data payload of a frame generated by implementing the method according to the invention, the only guard intervals remaining in such a frame being those intended to prevent two successive slots sent in opposite directions, e.g. uplink and downlink, to interfere with each other.

According to an advantageous embodiment of the invention, a method as described above may further include a width tuning step for adjusting the duration of said guard interval to a total duration required for transmitting a predetermined number of data symbols to be inserted in said guard interval.

Such a width tuning step will ensure that the guard interval will be entirely replaced by one or several data symbols, i.e. there will remain no time interval during which no information is exchanged through the bidirectional communication channel, which maximizes the increase in data payload obtained by virtue of the invention.

According to another advantageous embodiment of the invention, which may be implemented alternatively or cumulatively with the previous one, if each slot includes one or more pilot symbols, at least one of said pilot symbols is to be replaced by a data symbol in the course of the data insertion step.

As explained hereinbefore, pilot symbols are often used for channel estimation, though such symbols may also be used for other purposes such as frame synchronization. The inventor has observed that, in a situation were at least one of the transceivers linked together by the bidirectional channel moves at a high speed, e.g. if it is located within a vehicle, the channel properties will change so quickly that, no matter how short the slots are, the pre-equalization performed on the basis of an analysis of pilot symbols of a previous slot will have little or no relevance with respect with the real communication conditions the next slot will be subjected to. The findings of any pilot symbol analysis will then almost certainly be obsolete from one time slot to the next one. In such a case, no accurate pre-equalization may realistically be performed, so that the use of pilot symbols is superfluous, in which case said pilot symbols may be either suppressed, with the effect of reducing the overall duration of the frame, and thus enhancing its payload to duration ratio and hence the throughput of the channel, or replaced by data symbols, which increases the payload of the frame without increasing its overall duration of the frame with the same net effect.

Conversely, the method according to the invention may be used in a low mobility environment, in which all transceivers have a low velocity, which implies that the findings of any pilot symbol analysis will almost certainly be still valid from one time slot to the next one. In such a case, some of the pilot symbols will be redundant and may thus be suppressed.

According to yet another advantageous embodiment of the invention, which may be implemented alternatively or cumulatively with the previous ones, a method as described above may further include a resource allocation step for optimizing the directional allocation of the slots included in said at least one frame by systematically allocating a given slot to the same direction of communication to which the previous slot has been allocated, unless prevailing traffic constraints require a change of allocation, in which case said given slot will be allocated to a direction of communication opposite to the direction to which the previous slot has been allocated.

This embodiment of the invention aims at limiting, as much as possible, the number of direction switches within a given frame, in order to provide the highest possible number of successive isodirectional time slots, which will in turn enable to insert data in the highest possible number of guard intervals, and will thus help maximize the payload of such a frame.

The invention also relates to a signal carrying at least one frame enclosing information to be transmitted between at least two transceivers and generated by implementing a method according to any one of the embodiments described above.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE PREFERRED EMBODIMENTS

Figure 1:
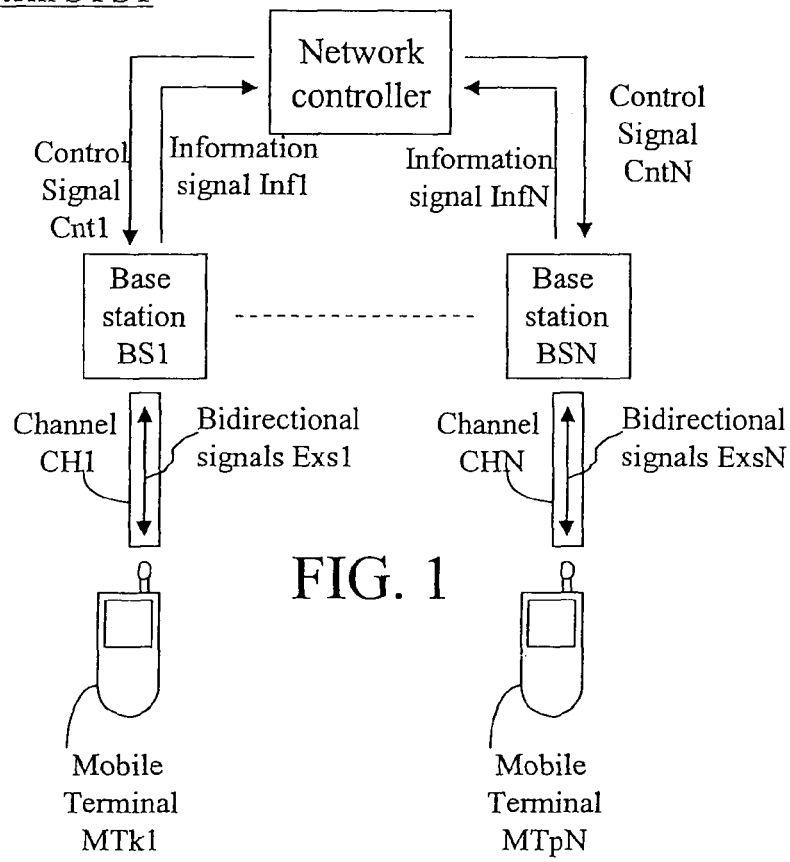
FIG. 1 is a schematic diagram depicting a telecommunication system in which a method according to the invention will be advantageously used for transmitting information.

FIG. 1 diagrammatically shows a wireless cellular telecommunication system SYST including a plurality N of cells serviced by radio base stations BS1 ... BSN, each of which being intended to communicate with at least one mobile terminal Mtk1 ... MTpN, respectively, through wireless communication channels CH1 ... CHN. The base stations BS1 ... BSN are controlled by a network controller NWC, to which said base stations BS1 ... BSN are to send information signals Inf1 ... InfN representative of their operating conditions, said network controller NWC being able to centralize all such information in order to determine how each base station should operate in order to optimally meet all requirements expressed by the mobile terminals through their relevant base stations. The network controller NWC accordingly is to send back control signals Cnt1 ... CntN to respective base stations BS1 ... BSN, which control signals may for example order a handover between two adjacent cells or a restriction of the throughput of the channel linking a given base station to a given mobile terminal in order to limit interference with a neighbouring channel established between another mobile terminal and a neighbouring base station.

Each communication channel CH1 ... CHN established between a mobile terminal MTk1 ... MTpN and its relevant base station BS1 ... BSN, respectively, is thus of a bidirectional nature and is intended to support bidirectional signals Exs1 ... ExsN carrying information either from a mobile terminal to a base station in a so-called uplink direction, or from a base station to said mobile terminal in an opposite, so-called downlink, direction, said information usually being enclosed within frames split into time slots allocated either to the uplink or to the downlink direction.

Figure 2:
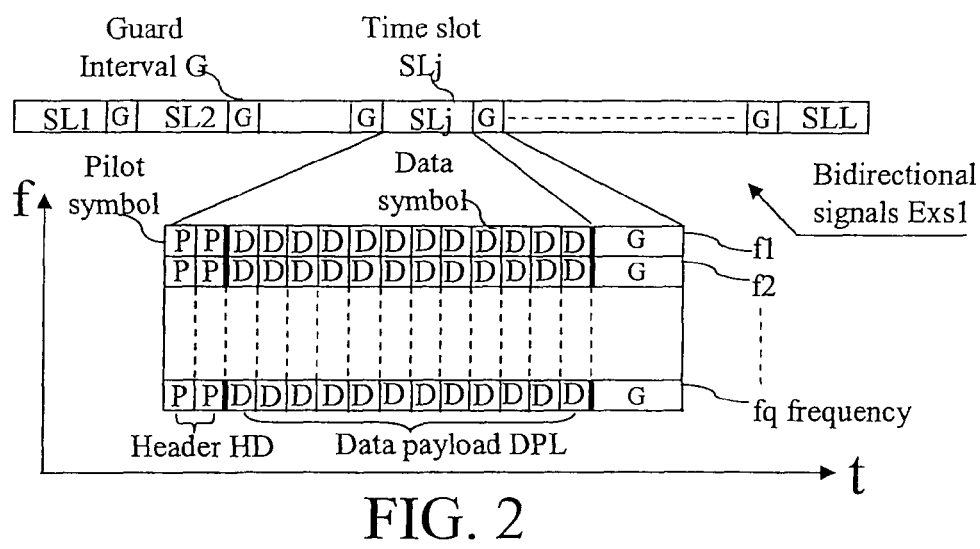
FIG. 2 is a chronogram depicting the structure of a conventional TDD/OFDM frame.

FIG. 2 diagrammatically shows how such a frame, carried by a bidirectional signal Exs1, may be structured. The frame shown in this particular example is of the TDD/OFDM type (standing for Time Division Duplex/Orthogonal Frequency Division Multiplex), which means that, in addition to the fact that it is subdivided into an integer number L of time slots SL1 ... SLL to be allocated either to a first or to a second direction of communication offered by the bidirectional communication channel, i.e. to the uplink or to the downlink direction, each time slot SLj (for j=1 to L) supports q sub-slots carried by a plurality of q orthogonal modulation frequencies f1, f2 ... fq allowing multiple access control as provided by the OFDM technique, which is in itself already known to those skilled in the art, which is equivalent to say that the frame carried by signal Exs1 includes q sub-frames split into respective successive sub-slots.

As demonstrated here, each time slot includes a header HD comprising pilot symbols P to be used by a receiver for channel estimation purposes and a data payload DPL comprising multiple data symbols D, each of which including data per se and a cycle prefix (not shown) performing at the symbol level an inter-symbol interference cancellation similar to the inter-slot interference cancellation performed at slot level by the guard intervals 0 arranged immediately after the time slots SLj (for j=1 to L).

In other embodiments of the invention, each slot SLj (for j=1 to L) may further include other pilot symbols not shown here and located at any other position, for example in the middle and/or at the end of said slot, in order to refresh the channel information previously provided to the receiver by means of the pilot symbols included in the header.

Figure 3:
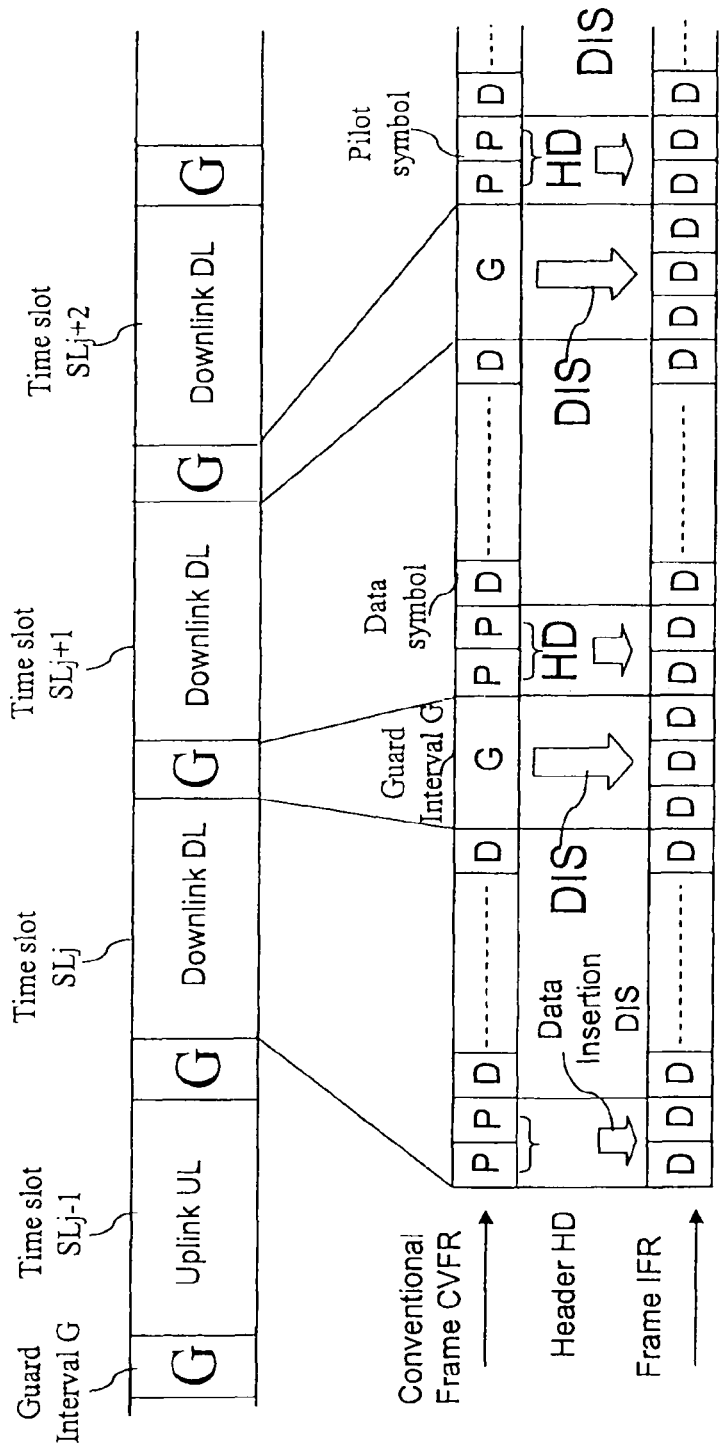
FIG. 3 is a chronogram depicting the structure of a frame obtained by virtue of the invention.

FIG. 3 shows how the configuration of a such data frame may be optimized by virtue of the invention in order to increase the ratio between the data payload of the frame and its overall duration, with the aim of increasing the data throughput of the bidirectional communication channel. According to the embodiment of the invention depicted here, a resource allocation step has already been carried out for optimizing the directional allocation of the frame, by systematically allocating a given slot to the same direction of communication to which the previous slot has been allocated, unless prevailing traffic constraints require a change of allocation, in which case said given slot will be allocated to a direction of communication opposite to the direction to which the previous slot has been allocated. In this example a direction switch, which has been considered unavoidable between the uplink direction UL to which time slot SLj-1 was allocated and the downlink direction DL to which time slot SLj has been allocated, is followed by at least two time slots SLj+1 and SLj+2 also allocated to the downlink direction DL, which will enable to insert data in at least two guard intervals, as will be explained hereinafter. The above described directional switch is made necessary by constraints which may stem from the sole workload of the relevant base station, which has to manage a known number of communications with e.g. respective predefined bit error rates and/or signal to noise or interference ratios, but may also stem from an analysis of the contents of control signals received by said base station from its network controller, which control signals may carry additional demands linked with operating conditions of neighbouring cells.

As has been depicted here, each time slot included in a conventional frame CVFR includes a header 14D comprising two pilot symbols P in this example, and a data payload D. Each time slot is separated from the next one by a guard interval G, the duration of which has been adjusted in this example to a total duration required for transmitting three data symbols D. Accordingly, in a frame generated by implementing a method according to the invention, carrying out a data insertion step DIS will enable to insert three data symbols D within the time interval formerly dedicated to a guard interval G, which hence enables to increase the data payload of a frame noted IFR, while ensuring that the total duration of the frame is an integer multiple of the duration of a single symbol (cyclic prefix included), which thus ensures that the data insertion step has no adverse effect on an established synchronization.

Furthermore, in the course of the data insertion step DIS according to the example depicted here, all pilot symbols P which are enclosed in the time slots SLj, SLj+1 and SLj+2 are also replaced by data symbols D, which maximizes the data payload of the frame IFR. In other embodiments of the invention, it may prove more advantageous to replace only one of the pilot symbols P included in a given header HD by a data symbol D. Besides, as already explained above, in yet other embodiments of the invention, other pilot symbols may be scattered among the data symbols D originally included within each time slot, which other pilot symbols may thus also be replaced by other data symbols D, whenever possible without adversely impacting on the performance of the ongoing communication.

The frame depicted in the present Figure represents only one of q sub-frames included in a TDD/OFDM frame as depicted in the previous drawing. It should be understood that in such an embodiment of the invention, a data insertion step DIS may be applied simultaneously to all q sub-frames carried by the q different modulation frequencies, or may be selectively carried out only for one or several sub-frames previously selected among said q sub-frames, depending upon the constraints to which each individual communication is subjected.

The invention claimed is:

1. A method for generating a frame of constant total duration for transmitting information in a bi-directional communication channel, said frame being split into a predefined number of time slots, each time slot being allocated either to a first or a second direction of communication offered by said bi-directional communication channel, the method comprising:

arranging, at a transceiver, a guard interval only between two consecutive timeslots of said frame when said two time slots are allocated to opposite directions of communication;

adjusting the duration of said guard interval to a total duration for transmitting a multiple number of symbols; and arranging pilot symbols at any position in the time slots.

2. A telecommunication system, comprising:

a base station; and a mobile terminal configured to transfer in a first direction data to the base station into at least one time slot of a frame of constant total duration, the base station configured to transfer in a second direction data to the mobile terminal into at another time slot of the frame, said frame being split into a predefined number of time slots, the base station configured to arrange a guard interval only between two consecutive timeslots of said frame when said two time slots are allocated to opposite directions of communication, and to adjust the duration of said guard interval to a total duration for transmitting a multiple number of symbols and to arrange pilot symbols at any position in the time slots.

* * * * *